US012735655B1

(12) United States Patent
Li et al.

(10) Patent No.: US 12,735,655 B1
(45) Date of Patent: Sep. 15, 2026

(54) FABRIC CARE AGENT FOR COLOR ENHANCEMENT AND BRIGHTENING AND PREPARATION METHOD THEREOF

(71) Applicant: Guangzhou Joyson Cleaning Products Co., Ltd., Guangzhou (CN)

(72) Inventors: Fenglei Li, Guangzhou (CN); Jieer Luo, Guangzhou (CN); Junli Li, Guangzhou (CN); Meiting Yuan, Guangzhou (CN)

(73) Assignee: Guangzhou Joyson Cleaning Products Co., Ltd., Guangzhou (CN)

( * ) Notice: Subject to any disclaimer, the term of this patent is extended or adjusted under 35 U.S.C. 154(b) by 0 days.

(21) Appl. No.: 19/448,891

(22) Filed: Jan. 14, 2026

Related U.S. Application Data

(63) Continuation of application No. PCT/CN2025/141859, filed on Dec. 11, 2025.

(51) Int. Cl.

| | |
|---|---|
| ***C11D 1/62*** | (2006.01) |
| ***C11D 1/66*** | (2006.01) |
| ***C11D 1/72*** | (2006.01) |
| ***C11D 1/722*** | (2006.01) |
| ***C11D 1/835*** | (2006.01) |
| ***C11D 3/04*** | (2006.01) |
| ***C11D 3/20*** | (2006.01) |
| ***C11D 3/22*** | (2006.01) |
| ***C11D 3/30*** | (2006.01) |
| ***C11D 3/37*** | (2006.01) |
| ***C11D 3/386*** | (2006.01) |
| ***C11D 3/50*** | (2006.01) |
| ***C11D 11/00*** | (2006.01) |
| ***C11D 17/04*** | (2006.01) |

(52) U.S. Cl.
CPC ................ *C11D 1/66* (2013.01); *C11D 3/046* (2013.01); *C11D 3/2065* (2013.01); *C11D 3/222* (2013.01); *C11D 3/30* (2013.01); *C11D 3/3707* (2013.01); *C11D 3/38645* (2013.01); *C11D 3/50* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 4,832,864 | A * | 5/1989 | Olson | D06P 5/02 8/102 |
| 2017/0175051 | A1* | 6/2017 | Fernandes | C11D 17/0034 |
| 2017/0260481 | A1* | 9/2017 | Vasquez Valdivieso | B29B 9/10 |
| 2020/0224126 | A1* | 7/2020 | Burgess | C11D 3/3707 |
| 2020/0325422 | A1* | 10/2020 | Schmiedel | C11D 3/43 |
| 2025/0002822 | A1* | 1/2025 | Burgess | C11D 3/38645 |
| 2025/0297198 | A1* | 9/2025 | Zhao | C11D 17/06 |
| 2025/0313779 | A1* | 10/2025 | Zhao | C11D 3/3715 |
| 2026/0008980 | A1* | 1/2026 | Fuller | C11D 17/065 |

OTHER PUBLICATIONS

People's Republic of China (PRC) national standard, "Determination of antistatic properties of fabric conditioners", Dec. 31, 2013, 18 pages.
People's Republic of China (PRC) light industry standard, "Evaluation method of antibacterial and bacteriostatic effect of daily chemical products", Apr. 21, 2023, 56 pages.
National Standards of the People's Republic of China, "Determination of detergency and cyclic washing performance of detergents for clothing", Mar. 9, 2021, 65 pages.
"Colorfastness to Laundering: Accelerated", AATCC Test Method 61-2010, AATCC Technical Manual, 2011, pp. 86-90.
People's Republic of China (PRC) Textile Industry Standard, "Testing and evaluating methods for tactile sensation of textiles-Multi-index integration method", Apr. 8, 2022, 49 pages.

* cited by examiner

*Primary Examiner* — Lorna M Douyon
(74) *Attorney, Agent, or Firm* — Cooper Legal Group, LLC

(57) ABSTRACT

The present application discloses a fabric care agent for color enhancement and brightening and a preparation method thereof. The fabric care agent for color enhancement and brightening includes a color-enhancing and fragrance-retaining composition and a color-protecting and fragrance-retaining composition. The color-enhancing and fragrance-retaining composition consists of the following raw materials by weight percentage: a first shaping agent: 42-70%; a color enhancer: 10-30%; a dispersant: 0.5-10%; cellulase: 1.5-5%; a first fragrance: 2-10%; and a first auxiliary agent: 0.5-3%. The color-protecting and fragrance-retaining composition consists of the following raw materials by weight percentage: a second shaping agent: 48-90%; a filler: 5-30%; a color-protecting agent: 0.5-10%; a second fragrance: 1-10%; and a second auxiliary agent 0.5-3%. The present application has the advantage of obtaining a care agent that can enhance and protect the color of fabrics without causing sedimentation problems.

10 Claims, 1 Drawing Sheet

FABRIC CARE AGENT FOR COLOR ENHANCEMENT AND BRIGHTENING AND PREPARATION METHOD THEREOF

CROSS-REFERENCE TO RELATED APPLICATIONS

The present application is a continuation application of PCT application No. PCT/CN2025/141859, filed on Dec. 11, 2025. The entirety of PCT application No. PCT/CN2025/141859 is hereby incorporated by reference herein and made a part of this specification.

TECHNICAL FIELD

The present application relates to the field of fabric care agents, and particularly to a fabric care agent for color enhancement and brightening and a preparation method thereof.

BACKGROUND ART

The interaction between natural fibers and dyes is physical, so when the fastness is not ideal enough, it is easy to cause fading. Currently, color-fixing and color-protecting laundry products enhance the brightness and color of fabrics by incorporating cationic polymers such as color-fixing and color-protecting agents to prevent dye shedding or by using cellulases to remove pilling from clothes.

Laundry products with color-fixing agents have obvious color fixation and protection effects during the first wash of fabrics after purchase, but they have limited brightening and color-enhancing effects on fabrics that have already faded. On the other hand, laundry products with cellulase only function to remove the pilling and finish the fabric fibers. These two types of products cannot fundamentally solve the problem of fabric fading. In addition, the addition of color-fixing agents may affect the stability of laundry detergent, causing phenomena such as stratification, sedimentation or discoloration. These phenomena not only affect the appearance of the laundry detergent but may also reduce its cleaning effect.

Currently, laundry papers used for blackening, bluing, and other purposes can bond a single dye to the surface of non-woven fabrics, which can play a role in "refurbishing" faded fabrics. In practical use, fabric care sheets based on non-woven fabric, due to the small area and light weight of the non-woven fabric, are prone to being sucked into the drainage pump when used in drum washing machines, which affects the service life of the washing machine. Moreover, the dyes bonded to the non-woven fabric cannot completely fall off during washing. Moreover, both before and after washing, the non-woven fabric needs to be directly touched by hand, making the skin susceptible to dye contamination.

SUMMARY

In order to obtain a care agent that can enhance and protect the color of fabrics without causing sedimentation problems, the present application provides a fabric care agent for color enhancement and brightening and a preparation method thereof.

In a first aspect, the present application provides a fabric care agent for color enhancement and brightening, which adopts the following technical solution:

A fabric care agent for color enhancement and brightening including a color-enhancing and fragrance-retaining composition and a color-protecting and fragrance-retaining composition; wherein the color-enhancing and fragrance-retaining composition consists of the following raw materials by weight percentage:

a first shaping agent: 42-70%; a color enhancer: 10-30%; a dispersant: 0.5-10%; cellulase: 1.5-5%; a first fragrance: 2-10%; and a first auxiliary agent: 0.5-3%;

the dispersant includes an esterquat and a non-ionic surfactant, and a mass ratio of the esterquat to the non-ionic surfactant is (0.5-5):(1-4);

the non-ionic surfactant includes one or more of fatty alcohol-polyoxyethylene ethers, alkoxylated compounds, or EO/PO block polyethers;

the color-protecting and fragrance-retaining composition consists of the following raw materials by weight percentage:

a second shaping agent: 48-90%; a filler: 5-30%; a color-protecting agent: 0.5-10%; a second fragrance: 1-10%; and a second auxiliary agent: 0.5-3%.

Quaternary ammonium salts are commonly used surfactants. However, when an ordinary quaternary ammonium salt is mixed with a color enhancer, not only can the color enhancer not be dispersed, but it also combines with the color enhancer to form lakes, thereby exacerbating the sedimentation phenomenon of the color-enhancing and fragrance-retaining composition, and even causing color changes. For this, an esterquat is selected in the present application. With the synergistic cooperation of the esterquat and the above-mentioned non-ionic surfactant as the dispersant, the solubility and dispersibility of the color enhancer during the preparation process can be significantly improved, reducing the agglomeration and sedimentation of the color enhancer, thereby improving the uniformity of the color enhancer in the color-enhancing and fragrance-retaining composition. Additionally, the esterquat possesses excellent softness, antistatic and bactericidal properties, thus endowing fabrics with corresponding performance advantages. By exerting the functions of the color enhancer and the color-protecting agent, the effects of enhancing and protecting the color of fabrics can be achieved without causing sedimentation problems.

Optionally, a mass ratio of the color enhancer to the dispersant is (3-15):1.

Preferably, the mass ratio of the color enhancer to the dispersant is (5-8):1.

Optionally, a mass ratio of the color-enhancing and fragrance-retaining composition to the color-protecting and fragrance-retaining composition is (0.5-6):1.

Optionally, the fatty alcohol-polyoxyethylene ether has an EO greater than or equal to 25.

Optionally, the alkoxylated compounds include one or more of alkyl glycoside alkoxylates, fatty acid alkoxylates, or cardanol alkoxylates.

Optionally, the first shaping agent and the second shaping agent each independently include polyethylene glycol with a molecular weight of 4,000-20,000. Preferably, the first shaping agent includes polyethylene glycol with a molecular weight of 4,000-15,000 and polyethylene glycol with a molecular weight of 18,000-22,000 at a mass ratio of (4-5):(1-2).

Where, the molecular weight in the present application means weight-average molecular weight.

By adopting the above technical solution, polyethylene glycols with different molecular weights are employed in a specific ratio to prepare the color-enhancing and fragrance-retaining composition and the color-protecting and fragrance-retaining composition, such that the dissolution time of the color-enhancing and fragrance-retaining composition in water is longer than that of the color-protecting and fragrance-retaining composition, enabling the color enhancer to preferentially bind to the fabric, and then to the color-protecting agent. Meanwhile, since the color-protecting and fragrance-retaining composition requires a certain time to dissolve, it will not affect the detergency of the laundry product when used together with the laundry product.

Optionally, the fabric care agent further includes a wrapping agent composed of a water-soluble polyvinyl alcohol film-forming agent, and the wrapping agent accounts for 1-16% by weight of the fabric care agent.

Preferably, the wrapping agent is a polyvinyl alcohol film.

Optionally, the color-protecting agent includes one or more of copolymers of vinylimidazole/vinylpyrrolidone, modified copolymers of vinylimidazole/vinylpyrrolidone, or aliphatic polyamine derivatives.

Optionally, the color enhancer includes a dye or a combination of the dye and a fluorescent whitening agent.

Optionally, the first auxiliary agent and the second auxiliary agent each independently include one or more of sodium chloride, sodium sulfate, or glycerol.

Optionally, the first fragrance and the second fragrance each independently include one or more of liquid fragrance or microencapsulated fragrance.

Optionally, the filler includes plant starch.

Optionally, the plant starch includes one or more of corn starch, tapioca starch, potato starch, pea starch, or glutinous rice flour.

In a second aspect, the present application provides a method for preparing the fabric care agent for color enhancement and brightening, which adopts the following technical solution:

A method for preparing the fabric care agent for color enhancement and brightening includes the following steps:

- heating the first shaping agent to melt the first shaping agent, and then adding, under stirring, the dispersant, the color enhancer, the first fragrance, cellulase, and the first auxiliary agent, to obtain a preliminary solution of the color-enhancing and fragrance-retaining composition;
- granulating the preliminary solution of the color-enhancing and fragrance-retaining composition, followed by cooling to obtain the color-enhancing and fragrance-retaining composition;
- heating the second shaping agent to melt the second shaping agent, and then adding, under stirring, the filler, the color-protecting agent, the second fragrance, and the second auxiliary agent, to obtain a color-protecting and fragrance-retaining preliminary solution;
- granulating the color-protecting and fragrance-retaining preliminary solution, followed by cooling to obtain the color-protecting and fragrance-retaining composition, then mixing the color-enhancing and fragrance-retaining composition with the color-protecting and fragrance-retaining composition to obtain the fabric care agent; alternatively, granulating the color-protecting and fragrance-retaining preliminary solution on a surface of the color-enhancing and fragrance-retaining composition, followed by cooling to obtain the fabric care agent.

In summary, the present application has the following beneficial effects:

In the present application, with the synergistic cooperation of an esterquat and the above-mentioned non-ionic surfactant as the dispersant, the solubility and dispersibility of the color enhancer during the preparation process can be significantly improved, reducing the agglomeration and sedimentation of the color enhancer, thereby improving the uniformity of the color enhancer in the color-enhancing and fragrance-retaining composition. Additionally, the esterquat possesses excellent softness, antistatic and bactericidal properties, thus endowing fabrics with corresponding performance advantages. By exerting the functions of the color enhancer and the color-protecting agent, the effects of enhancing and protecting the color of fabrics can be achieved without causing sedimentation problems.

DETAILED DESCRIPTION

The present application will be further illustrated in detail in conjunction with the drawings and examples.

Some of the raw materials used in the following examples are as follows:

The esterquat is C16-C18, purchased from Guangzhou Txin Chemical Co., Ltd.

Fatty alcohol-polyoxyethylene ether, purchased from BASF-China, with an EO number ≥25.

EO/PO block polyether, purchased from BASF-China, Model Pluronic PE 6100.

Poly(diallyl dimethyl ammonium chloride), purchased from Shanghai Zhaochang Senyong Textile Co., Ltd, Model 50D.

Copolymer of vinylimidazole/vinylpyrrolidone, purchased from BASF-China, Model Sokalan HP 56K.

Modified copolymer of vinylimidazole/vinylpyrrolidone, purchased from BASF-China, Model Sokalan HP 66K.

Aliphatic polyamine derivatives, purchased from Clariant Chemicals (China), Model TexCare DFC 6 pre.

Alkyl glycoside alkoxylates, purchased from China Research Institute of Daily Chemical Industry, Model APG-NF.

Fatty acid alkoxylates, purchased from BASF, Model Emulan A.

The manufacturers and models mentioned above are used only to support and sufficiently disclose the technical solutions of the present application, and are not intended to limit the present application to the listed manufacturers or models.

Example 1

A fabric care agent for color enhancement and brightening includes a color-enhancing and fragrance-retaining composition and a color-protecting and fragrance-retaining composition, wherein a mass ratio of the color-enhancing and fragrance-retaining composition to the color-protecting and fragrance-retaining composition is 0.5:1.

The color-enhancing and fragrance-retaining composition consists of the following raw materials by weight percentage:

61.5% polyethylene glycol, 23% direct fast black, 1% cellulase, 2.5% esterquat, 2% alkyl glycoside alkoxylate, 1% sodium chloride, 1% glycerol, 4% liquid fragrance, and 4% microencapsulated fragrance.

Among them, the polyethylene glycol is compounded from polyethylene glycol with a weight-average molecular weight of 20,000 and polyethylene glycol with a weight-average molecular weight of 6,000 according to a mass ratio of 5:2.

The color-protecting and fragrance-retaining composition consists of the following raw materials by weight percentage:

56% polyethylene glycol, 25% glutinous rice flour, 8% copolymer of vinylimidazole/vinylpyrrolidone, 8% liquid fragrance, 1% microencapsulated fragrance, and 2% glycerol.

Among them, the polyethylene glycol is polyethylene glycol with a weight-average molecular weight of 20,000.

Figure 1:
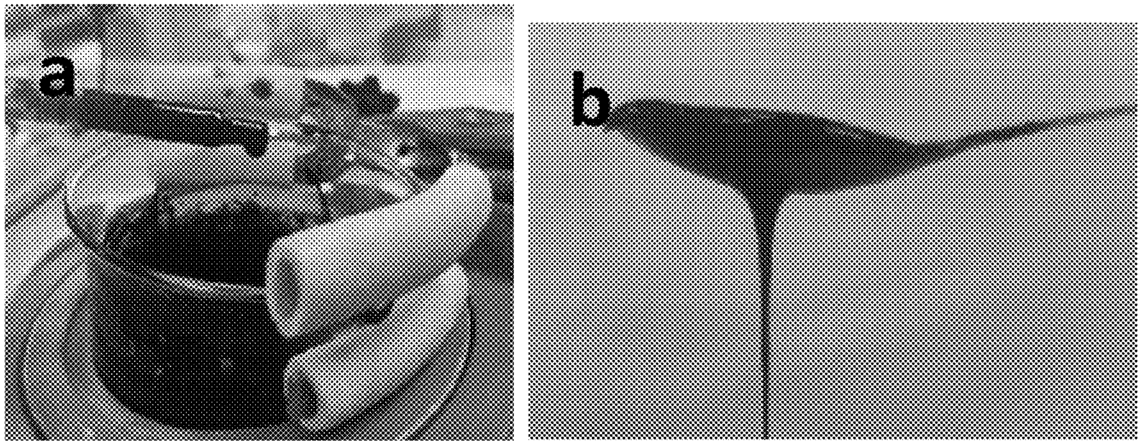
FIG. 1 is a photograph of a preliminary solution of the color-enhancing and fragrance-retaining composition prepared in Example 1 of the present application.

A method for preparing the fabric care agent for color enhancement and brightening included the following steps: the polyethylene glycol in the color-enhancing and fragrance-retaining composition was heated at 70° C. to melt the polyethylene glycol, and then, under stirring, the esterquat and the alkyl glycoside alkoxylate were added; after stirring evenly, the fast black was direct added and then stopped heating after stirring evenly to obtain a mixture; the mixture was cooled to 65° C. and then the liquid fragrance, the microencapsulated fragrance, the cellulase, the sodium chloride, and the glycerol in the color-enhancing and fragrance-retaining composition were successively added, stirred evenly to obtain a preliminary solution of the color-enhancing and fragrance-retaining composition, with a photograph shown in FIG. 1;

the preliminary solution of the color-enhancing and fragrance-retaining composition was granulated with a granulator, followed by cooled to obtain the color-enhancing and fragrance-retaining composition;

the polyethylene glycol in the color-protecting and fragrance-retaining composition was heated at 75° C. to melt the polyethylene glycol, and then, under stirring, the glutinous rice flour was added, and stopped heating after stirring evenly to obtain a mixture; the mixture was cooled to 65° C. and then the copolymer of vinylimidazole/vinylpyrrolidone, the liquid fragrance, the microencapsulated fragrance, and the glycerol in the color-protecting and fragrance-retaining composition were successively added, stirred evenly to obtain a color-protecting and fragrance-retaining preliminary solution;

the color-protecting and fragrance-retaining preliminary solution was granulated with a granulator, followed by cooled to obtain the color-protecting and fragrance-retaining composition; and the color-enhancing and fragrance-retaining composition and the color-protecting and fragrance-retaining composition were mixed to obtain the fabric care agent.

Example 2

A fabric care agent for color enhancement and brightening includes a color-enhancing and fragrance-retaining composition and a color-protecting and fragrance-retaining composition, wherein a mass ratio of the color-enhancing and fragrance-retaining composition to the color-protecting and fragrance-retaining composition is 6:1.

The color-enhancing and fragrance-retaining composition consists of the following raw materials by weight percentage:

65.7% polyethylene glycol, 20% direct fast black, 0.8% cellulase, 1.5% esterquat, 1.5% fatty alcohol-polyoxyethylene ether, 2.5% sodium sulfate, 6% liquid fragrance, and 2% microencapsulated fragrance.

Among them, the polyethylene glycol is compounded from polyethylene glycol with a weight-average molecular weight of 20,000 and polyethylene glycol with a weight-average molecular weight of 15,000 according to a mass ratio of 4:1.

The color-protecting and fragrance-retaining composition consists of the following raw materials by weight percentage:

64% polyethylene glycol, 19% pea starch, 9% aliphatic polyamine derivative, 3% liquid fragrance, 3% microencapsulated fragrance, and 2% glycerol.

Among them, the polyethylene glycol is polyethylene glycol with a weight-average molecular weight of 20,000.

A method for preparing the fabric care agent for color enhancement and brightening includes the following steps:

the polyethylene glycol in the color-enhancing and fragrance-retaining composition was heated at 80° C. to melt the polyethylene glycol, and then, under stirring, the esterquat and the fatty alcohol-polyoxyethylene ether were added; after stirring evenly, the fast black was direct added, and then stopped heating after stirring evenly to obtain a mixture; the mixture was cooled to 65° C. and then the liquid fragrance, the microencapsulated fragrance, the cellulase, and the sodium sulfate in the color-enhancing and fragrance-retaining composition were successively added, stirred evenly to obtain a preliminary solution of the color-enhancing and fragrance-retaining composition;

the preliminary solution of the color-enhancing and fragrance-retaining composition was granulated with a granulator, followed by cooled to obtain the color-enhancing and fragrance-retaining composition;

the polyethylene glycol in the color-protecting and fragrance-retaining composition was heated at 75° C. to melt the polyethylene glycol, and then, under stirring, the pea starch was added, and stopped heating after stirring evenly to obtain a mixture; the mixture was cooled to 65° C. and then the aliphatic polyamine derivative, the liquid fragrance, the microencapsulated fragrance, and the glycerol in the color-protecting and fragrance-retaining composition were successively added, stirred evenly to obtain a color-protecting and fragrance-retaining preliminary solution;

the color-protecting and fragrance-retaining preliminary solution was granulated with a granulator, followed by cooled to obtain the color-protecting and fragrance-retaining composition; and the color-enhancing and fragrance-retaining composition and the color-protecting and fragrance-retaining composition were mixed to obtain the fabric care agent.

Example 3

A fabric care agent for color enhancement and brightening includes a color-enhancing and fragrance-retaining composition, a color-protecting and fragrance-retaining composition and a wrapping agent, wherein a mass ratio of the color-enhancing and fragrance-retaining composition to the color-protecting and fragrance-retaining composition to the wrapping agent is 1:1:0.02.

The color-enhancing and fragrance-retaining composition consists of the following raw materials by weight percentage:

62% polyethylene glycol, 21% direct fast black, 2% cellulase, 2.5% esterquat, 3% fatty alcohol-polyoxyethylene ether, 1.5% fatty acid alkoxylate, 0.5% sodium sulfate, 5% liquid fragrance, and 3% microencapsulated fragrance.

Among them, the polyethylene glycol is compounded from polyethylene glycol with a weight-average molecular weight of 20,000 and polyethylene glycol with a weight-average molecular weight of 15,000 according to a mass ratio of 4:1.

The color-protecting and fragrance-retaining composition consists of the following raw materials by weight percentage:

61% polyethylene glycol, 23% pea starch, 5% aliphatic polyamine derivative, 1% modified vinylimidazole/vinylpyrrolidone, 1% copolymer of vinylimidazole/vinylpyrrolidone, 5% liquid fragrance, 2% microencapsulated fragrance, and 2% glycerol.

Among them, the polyethylene glycol is polyethylene glycol with a weight-average molecular weight of 20,000.

A method for preparing the fabric care agent for color enhancement and brightening included the following steps:

the polyethylene glycol in the color-enhancing and fragrance-retaining composition was heated at 80° C. to melt the polyethylene glycol, and then, under stirring, the esterquat, the fatty alcohol-polyoxyethylene ether and the fatty acid alkoxylate were added; after stirring evenly, the fast black was direct added, and then stopped heating after stirring evenly to obtain a mixture; the mixture was cooled to 65° C. and then the liquid fragrance, the microencapsulated fragrance, the cellulase, and the sodium sulfate in the color-enhancing and fragrance-retaining composition were successively added, stirred evenly to obtain a preliminary solution of the color-enhancing and fragrance-retaining composition;

the preliminary solution of the color-enhancing and fragrance-retaining composition was granulated with a granulator, followed by cooled to obtain the color-enhancing and fragrance-retaining composition;

the polyethylene glycol in the color-protecting and fragrance-retaining composition was heated at 75° C. to melt the polyethylene glycol, and then, under stirring, the pea starch was added, and stopped heating after stirring evenly to obtain a mixture; the mixture was cooled to 65° C. and then the copolymer of vinylimidazole/vinylpyrrolidone, the liquid fragrance, the microencapsulated fragrance, and the glycerol in the color-protecting and fragrance-retaining composition were successively added, stirred evenly to obtain a color-protecting and fragrance-retaining preliminary solution; and the color-protecting and fragrance-retaining preliminary solution was granulated with a granulator, followed by cooled to obtain the color-protecting and fragrance-retaining composition, the color-enhancing and fragrance-retaining composition and the color-protecting and fragrance-retaining composition were mixed, and then loaded them together using the wrapping agent which was a polyvinyl alcohol film, finally bottled to obtain a finished product.

Example 4

This example is different from Example 1 in that the components of the color-enhancing and fragrance-retaining composition are different.

The color-enhancing and fragrance-retaining composition consists of the following raw materials by weight percentage:

50.5% polyethylene glycol, 28% direct fast blue, 2.5% cellulase, 5% esterquat, 4% fatty acid alkoxylate, 1% sodium chloride, 1% glycerol, 4% liquid fragrance, 4% microencapsulated fragrance, and the remaining are the same.

Among them, the polyethylene glycol is compounded from polyethylene glycol with a weight-average molecular weight of 20,000 and polyethylene glycol with a weight-average molecular weight of 6,000 according to a mass ratio of 5:2.

Example 5

A fabric care agent for color enhancement and brightening, featuring a double-layer semi-encapsulated design, includes a color-enhancing and fragrance-retaining composition and a color-protecting and fragrance-retaining composition, wherein a mass ratio of the color-enhancing and fragrance-retaining composition to the color-protecting and fragrance-retaining composition is 0.5:1.

The color-enhancing and fragrance-retaining composition consists of the following raw materials by weight percentage:

67% polyethylene glycol, 14.5% direct fast black, 5% fluorescent whitening agent, 1% cellulase, 0.5% esterquat, 1% alkyl glycoside alkoxylate, 0.5% fatty alcohol-polyoxyethylene ether, 0.5% EO/PO block polyether, 1% sodium chloride, 1% glycerol, 4% liquid fragrance, and 4% microencapsulated fragrance.

Among them, the polyethylene glycol is polyethylene glycol with a weight-average molecular weight of 8,000.

The color-protecting and fragrance-retaining composition consists of the following raw materials by weight percentage:

62% polyethylene glycol, 25% glutinous rice flour, 5% aliphatic polyamine derivative, 5% liquid fragrance, 1% microencapsulated fragrance, and 2% glycerol.

Among them, the polyethylene glycol is polyethylene glycol with a weight-average molecular weight of 20,000.

A method for preparing the fabric care agent for color enhancement and brightening included the following steps:

the polyethylene glycol in the color-enhancing and fragrance-retaining composition was heated at 70° C. to melt the polyethylene glycol, and then, under stirring, the esterquat and the alkyl glycoside alkoxylate were added; after stirring evenly, the direct fast black and the fluorescent whitening agent were added, and then stopped heating after stirring evenly to obtain a mixture; the mixture was cooled to 65° C. and then the liquid fragrance, the microencapsulated fragrance, the cellulase, the sodium chloride and the glycerol in the color-enhancing and fragrance-retaining composition were successively added, stirred evenly to obtain a preliminary solution of the color-enhancing and fragrance-retaining composition;

the preliminary solution of the color-enhancing and fragrance-retaining composition was granulated with a granulator, followed by cooled to obtain the color-enhancing and fragrance-retaining composition;

the polyethylene glycol in the color-protecting and fragrance-retaining composition was heated at 75° C. to melt the polyethylene glycol, and then, under stirring, the glutinous rice flour was added, and stopped heating after stirring evenly to obtain a mixture; the mixture was cooled to 65° C. and then the aliphatic polyamine derivative, the liquid fragrance, the microencapsulated fragrance, and the glycerol in the color-protecting and fragrance-retaining composition were successively added, stirred evenly to obtain a color-protecting and fragrance-retaining preliminary solution; and the color-protecting and fragrance-retaining preliminary solution was granulated with a granulator on a surface of the color-enhancing and fragrance-retaining composition, followed by cooled to obtain the fabric care agent, finally bottled to obtain a finished product.

Example 6

This example is different from Example 1 in that the amounts of raw materials of the color-enhancing and fragrance-retaining composition and the color-protecting and fragrance-retaining composition are different, and direct fast red is used instead of the direct fast black.

The color-enhancing and fragrance-retaining composition consists of the following raw materials by weight percentage:

42% polyethylene glycol, 30% direct fast red, 5% cellulase, 6% esterquat, 4% alkyl glycoside alkoxylate, 1% sodium chloride, 2% glycerol, 5% liquid fragrance, and 5% microencapsulated fragrance.

The color-protecting and fragrance-retaining composition consists of the following raw materials by weight percentage:

90% polyethylene glycol, 5% glutinous rice flour, 0.5% copolymer of vinylimidazole/vinylpyrrolidone, 2% liquid fragrance, 2% microencapsulated fragrance, and 0.5% glycerol.

Example 7

This example is different from Example 1 in that the amounts of raw materials of the color-enhancing and fragrance-retaining composition and the color-protecting and fragrance-retaining composition are different, and direct fast yellow is used instead of the direct fast black.

The color-enhancing and fragrance-retaining composition consists of the following raw materials by weight percentage:

70% polyethylene glycol, 22.5% direct fast yellow, 2% cellulase, 1% esterquat, 0.5% alkyl glycoside alkoxylate, 0.2% sodium chloride, 0.3% glycerol, 2% liquid fragrance, and 1.5% microencapsulated fragrance.

The color-protecting and fragrance-retaining composition consists of the following raw materials by weight percentage:

48.5% polyethylene glycol, 30% glutinous rice flour, 9.5% copolymer of vinylimidazole/vinylpyrrolidone, 4% liquid fragrance, 4% of microencapsulated fragrance, and 3% of glycerol.

Comparative Example 1

This comparative example is different from Example 1 in that the color-enhancing and fragrance-retaining composition is different.

The color-enhancing and fragrance-retaining composition consists of the following raw materials by weight percentage:

66% of polyethylene glycol, 23% of direct fast black, 1% of cellulase, 1% of sodium chloride, 1% of glycerol, 4% of liquid fragrance, and 4% of microencapsulated fragrance.

Among them, polyethylene glycol is compounded from polyethylene glycol with a weight-average molecular weight of 20,000 and polyethylene glycol with a weight-average molecular weight of 6,000 according to a mass ratio of 5:2.

Figure 2:
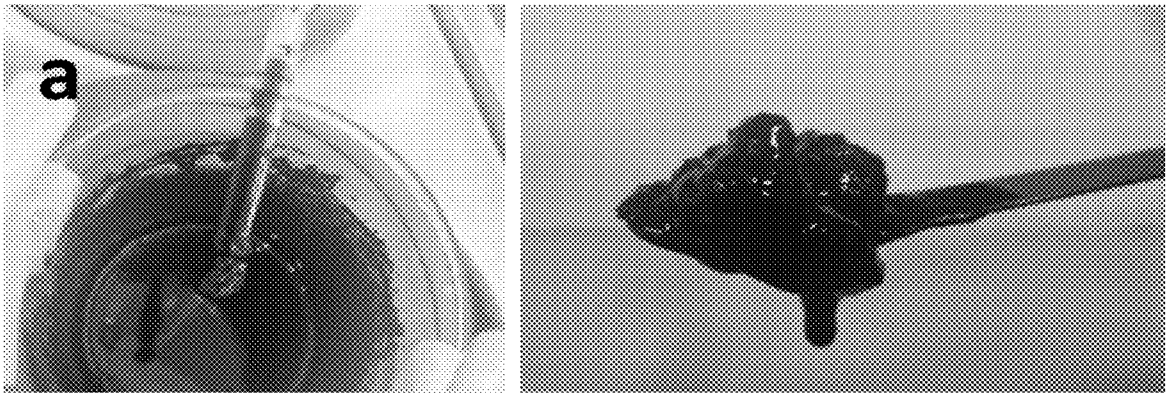
FIG. 2 is a photograph of a preliminary solution of the color-enhancing and fragrance-retaining composition prepared in Comparative Example 1 of the present application.

The photograph of a preliminary solution of the color-enhancing and fragrance-retaining composition prepared from the above raw materials of the color-enhancing and fragrance-retaining composition is shown in FIG. 2.

Comparative Example 2

This comparative example is different from Example 1 in that the color-enhancing and fragrance-retaining composition is different.

The color-enhancing and fragrance-retaining composition consists of the following raw materials by weight percentage:

61.5% of polyethylene glycol, 23% of direct fast black, 1% of cellulase, 2.5% esterquat, 2% alkyl glycoside, 1% sodium chloride, 1% glycerol, 4% liquid fragrance, and 4% microencapsulated fragrance.

Comparative Example 3

This comparative example is different from Example 1 in that the color-enhancing and fragrance-retaining composition is different.

The color-enhancing and fragrance-retaining composition consists of the following raw materials by weight percentage:

61.5% polyethylene glycol, 23% direct fast black, 1% cellulase, 2.5% poly(diallyl dimethyl ammonium chloride), 2% alkyl glycoside alkoxylate, 1% sodium chloride, 1% glycerol, 4% liquid fragrance, and 4% microencapsulated fragrance.

Comparative Example 4

This comparative example is different from Example 1 in that the color-enhancing and fragrance-retaining composition is different.

The color-enhancing and fragrance-retaining composition consists of the following raw materials by weight percentage:

61.5% polyethylene glycol, 23% direct fast black, 1% cellulase, 4.5% alkyl glycoside alkoxylate, 1% sodium chloride, 1% glycerol, 4% liquid fragrance, and 4% microencapsulated fragrance.

Comparative Example 5

This comparative example is different from Example 1 in that the color-enhancing and fragrance-retaining composition is different.

The color-enhancing and fragrance-retaining composition consists of the following raw materials by weight percentage:

61.5% polyethylene glycol, 23% direct fast black, 1% cellulase, 2.5% esterquat, 2% Tween-20, 1% sodium chloride, 1% glycerol, 4% liquid fragrance, and 4% microencapsulated fragrance.

Comparative Example 6

This comparative example is different from Example 1 in that the color-protecting and fragrance-retaining composition is not contained.

Statistics of Yield

Within the same period of time, the yields of the fabric care agent for color enhancement and brightening prepared in different examples or comparative examples were recorded. The results are shown in Table 1.

TABLE 1

Yield of fabric care agents for color enhancement and brightening within the same period of time

| | Total feed mass M1/kg | Output of qualified color-enhancing care beads M2/kg | Yield/% = (M2/M1 · 100%) |
|---|---|---|---|
| Example 1 | 10.00 | 9.49 | 94.9 |
| Example 2 | 10.00 | 9.24 | 92.4 |
| Example 3 | 10.00 | 9.56 | 95.6 |
| Example 4 | 10.00 | 9.33 | 93.3 |
| Example 5 | 10.00 | 9.61 | 96.1 |
| Example 6 | 10.00 | 9.38 | 93.8 |
| Example 7 | 10.00 | 9.41 | 94.1 |
| Comparative Example 1 | 10.00 | 1.85 | 18.5 |
| Comparative Example 2 | 10.00 | 5.27 | 52.7 |
| Comparative Example 3 | 10.00 | 1.24 | 12.4 |
| Comparative Example 4 | 10.00 | 3.71 | 37.1 |
| Comparative Example 5 | 10.00 | 5.12 | 51.2 |

Regardless of whether a small-scale or large-scale device is used, when there are insoluble precipitates in the stock solution, the precipitates tend to aggregate due to the force of gravity and preferentially flow out of the device for granulation. During this process, a portion of the precipitates fail to be discharged and remain at the granulation orifice. After multiple granulation operations, the diameter of the granulation orifice becomes smaller and smaller, resulting in non-uniform size and shape of the granules (unqualified products). More seriously, the precipitates will block the granulation orifice, making granulation impossible.

As shown in FIG. 1, the liquid droplets of the preliminary solution of the color-enhancing and fragrance-retaining composition in Example 1 can naturally drop down, and the granulation yield can reach up to 94.9%. In Comparative Example 1, no dispersant was added. FIG. 2 shows that the preliminary solution of the color-enhancing and fragrance-retaining composition in Comparative Example 1 forms lumps, resulting in a yield of only 18.5%. The output of the color-enhancing care beads decreased significantly when other non-ionic surfactants were used instead of alkoxylated compounds in Comparative Examples 2 and 5. In Comparative Example 4, the dispersant esterquat was not added, while the content of another dispersant, the alkoxylated compound, was increased, resulting in a decrease in the yield of the color-enhancing care beads. In Comparative Example 3, when other quaternary ammonium salts were used in equal amounts to replace the esterquat, the yield of the resulting fabric care agent for color enhancement and brightening was significantly reduced to 12.4% and was lower than that of Comparative Example 1 without any dispersant. Due to the replacement of the dispersant, the color enhancer could not be evenly dispersed in the stock solution, resulting in low yields in the Comparative Examples 1-5. At the same time, the content of the color enhancer in the resulting fabric care agent for color enhancement and brightening was far lower than the actual addition amount of the color enhancer.

Testing and Evaluation

Subjective evaluation of color-enhancing effect: Black/blue/red/yellow fabrics were washed over 30 times with national standard laundry detergent until they appeared white. They were then cut into square fabric pieces of 30×30 cm and washed with 15 g of the samples to evaluate the color-enhancing effects of different samples (from 1 to 11, with 1 being the best and 11 being the worst). The results are shown in Table 2.

TABLE 2

Sensory evaluation results of black-enhancing effects

| Personnel | Samples | | | | | | | | | | |
|---|---|---|---|---|---|---|---|---|---|---|---|
| | Example 1 | Example 2 | Example 3 | Example 5 | Comparative Example 1 | Comparative Example 2 | Comparative Example 3 | Comparative Example 4 | Comparative Example 5 | Commercially available black-enhancing laundry detergent | Commercially available non-woven black-enhancing sheet |
| 1 | 1 | 3 | 2 | 4 | 8 | 5 | 9 | 10 | 6 | 11 | 7 |
| 2 | 1 | 3 | 2 | 4 | 8 | 6 | 10 | 7 | 5 | 11 | 9 |
| 3 | 1 | 2 | 3 | 4 | 8 | 7 | 9 | 10 | 5 | 11 | 6 |
| 4 | 2 | 3 | 1 | 4 | 9 | 5 | 10 | 7 | 6 | 11 | 8 |
| 5 | 1 | 3 | 2 | 4 | 8 | 6 | 10 | 9 | 5 | 11 | 7 |
| 6 | 2 | 3 | 1 | 4 | 7 | 5 | 10 | 8 | 6 | 11 | 9 |
| 7 | 1 | 3 | 2 | 4 | 8 | 5 | 10 | 9 | 7 | 11 | 6 |
| 8 | 2 | 3 | 1 | 4 | 8 | 5 | 10 | 9 | 6 | 11 | 7 |
| 9 | 3 | 2 | 1 | 4 | 9 | 7 | 10 | 8 | 5 | 11 | 6 |
| 10 | 1 | 3 | 2 | 4 | 9 | 5 | 10 | 8 | 6 | 11 | 7 |
| Cumulative | 15 | 28 | 17 | 40 | 82 | 56 | 98 | 85 | 57 | 110 | 72 |

Ranking of black-enhancing effect: Example 1 > Example 3 > Example 2 > Example 5 > Comparative Example 2 > Comparative Example 5 > Commercially available non-woven black-enhancing sheet > Comparative Example 1 > Comparative Example 4 > Comparative Example 3 > Commercially available black-enhancing laundry detergent As shown in Table 2, the black-enhancing effects in Comparative Examples 1-5 are all weaker than that in Example 1.

Color fastness test: In accordance with AATCC 61-2010, "Colorfastness to Laundering: Accelerated", a soap solution was prepared (5 g of soap powder per liter of water for the 40° C. test conditions, 5 g of soap powder and 2 g of sodium carbonate per liter of water for the 60° C. test conditions). A piece of black, blue, red, or yellow fabric (the fabric after the above color-enhancing effect test was cut into pieces of 8×3 cm) was sewn together with a multi-fiber laminated fabric to form a composite sample. The composite fabric sample was placed in a colorfastness to laundering tester for washing. After air-drying, the above procedure was repeated for a total of 25 washing cycles. After the washing cycles were completed, the degree of color change (after 25 washing cycles) and the degree of staining (after 1 washing cycle) of the sample were evaluated using a gray scale for color change and a gray scale for staining, respectively (from Grade 5 to Grade 1, with Grade 5 being the best and Grade 1 being the worst). The results are shown in Table 3.

TABLE 3

Colorfastness Test Results

| Test conditions | Test sample | Grade of degree of color change after 25 washing cycles | Grade of degree of staining after 1 washing cycle |
|---|---|---|---|
| Temperature: 40° C. | Ordinary soap solution (black fabric) | 2 | — |
| Time: 30 min Without sodium carbonate | Ordinary soap solution (blue fabric) | 1-2 | — |
| | Example 1 | 5 | 5 |
| | Example 2 | 5 | 5 |
| | Example 3 | 5 | 5 |
| | Example 4 | 5 | 5 |
| | Example 5 | 5 | 4-5 |
| | Comparative Example 1 | 3 | 4 |
| | Comparative Example 2 | 3 | 4 |
| | Comparative Example 3 | 2-3 | 4 |
| | Comparative Example 4 | 2 | 4 |
| | Comparative Example 5 | 3-4 | 4 |
| | Comparative Example 6 | 3 | 3 |
| | Commercially available non-woven black-enhancing sheet | 2 | 1 |
| | Commercially available non-woven blue-enhancing sheet | 2 | 1 |

TABLE 3-continued

Colorfastness Test Results

| Test conditions | Test sample | Grade of degree of color change after 25 washing cycles | Grade of degree of staining after 1 washing cycle |
|---|---|---|---|
| Temperature: 60° C. | Ordinary soap solution (black fabric) | 1-2 | — |
| Time: 30 min With sodium carbonate | Ordinary soap solution (bluef abric) | 1-2 | — |
| | Example 1 | 5 | 5 |
| | Example 2 | 5 | 5 |
| | Example 3 | 5 | 5 |
| | Example 4 | 5 | 5 |
| | Example 5 | 5 | 4 |
| | Comparative Example 1 | 2 | 4 |
| | Comparative Example 2 | 2-3 | 4 |
| | Comparative Example 3 | 2 | 4 |
| | Comparative Example 4 | 4 | 4 |
| | Comparative Example 5 | 3-4 | 4 |
| | Comparative Example 6 | 2-3 | 2-3 |
| | Commercially available non-woven black-enhancings heet | 1-2 | 1 |
| | Commercially available non-woven blue-enhancing sheet | 1-2 | 1 |

As shown in Table 3, the black/blue fabrics washed once with Examples 1-5 can still maintain good color fastness after being washed 25 times with soap solution at different temperatures. It can be seen from Tables 4, 5 and 6 that without the addition of softeners, antistatic agents or bactericides, these examples have good softening, antistatic and antibacterial effects on fabrics.

Subjective evaluation of fabric hand feel: In accordance with Appendix A of FZ/T 01166-2022 "Textiles—Testing and Evaluation for Fabric Touch Sensation: Multi-Index Integration Method", the surface roughness of the washed fabrics was evaluated on a 10-point scale, with scores ≤5 indicating an unsmooth surface, using unwashed black fabric as the reference. The results are shown in Table 4.

TABLE 4

Sensory evaluation results of softening effect

| | Example 1 | Example 2 | Example 3 | Comparative Example 3 | Commercially available black-enhancing laundry detergent | Commercially available non-woven black-enhancing sheet |
|---|---|---|---|---|---|---|
| 1 | 9 | 9 | 8 | 2 | 1 | 1 |
| 2 | 8 | 9 | 8 | 3 | 1 | 1 |
| 3 | 6 | 8 | 9 | 2 | 3 | 1 |
| 4 | 6 | 6 | 8 | 2 | 3 | 1 |
| 5 | 8 | 9 | 9 | 4 | 1 | 2 |
| 6 | 6 | 8 | 6 | 2 | 1 | 2 |
| 7 | 9 | 7 | 5 | 1 | 2 | 1 |
| 8 | 7 | 9 | 6 | 2 | 3 | 2 |
| 9 | 8 | 7 | 8 | 1 | 2 | 1 |
| 10 | 7 | 8 | 7 | 1 | 4 | 1 |
| Cumulative | 74 | 80 | 74 | 20 | 21 | 13 |

Ranking of softness scores: Example 2 > Example 1 = Example 3 > Comparative Example 3 > Commercially available black-enhancing laundry detergent > Commercially available non-woven black-enhancing sheet Fabric conditioning antistatic test: The test was conducted in accordance with GB/T6801-2013 "Determination of Antistatic Performance for Fabric Conditioners". A difference in the logarithmic surface resistivity value Δlgρs of ≥2.5 was considered qualified. The test polyester fabric was purchased from the National Institute of Daily Chemical Industry. The results are shown in Table 5.

TABLE 5

Antistatic test results

| Sample Name | Sample Concentration | Difference in the logarithmic surface resistivity value of fabrics (Antistatic property) Δlgρs | Result |
|---|---|---|---|
| Example 1 | 2.5 g/L | 4.0 | Qualified |
| Example 2 | 2.5 g/L | 3.6 | Qualified |
| Example 3 | 2.5 g/L | 3.9 | Qualified |
| Example 4 | 2.5 g/L | 4.6 | Qualified |
| Example 5 | 2.5 g/L | 3.5 | Qualified |
| Example 6 | 2.5 g/L | 4.0 | Qualified |
| Commercially available color-enhancing laundry detergent | 10.0 g/L | 1.5 | Unqualified |

Antibacterial performance test: The test was conducted in accordance with QB/T 2738-2023, "Evaluation Methods for Antibacterial and Bacteriostatic Effects of Daily Chemical Products", to determine the inhibition rates against *Staphylococcus aureus* and *Escherichia coli*. The results are shown in Table 6.

TABLE 6

Antibacterial test results

| Sample Name | Inhibition rate against *Escherichia coli*/% | Inhibition rate against *Staphylococcus aureus*/% |
|---|---|---|
| Example 1 | 97.19 | 97.30 |
| Example 2 | 98.47 | 98.54 |
| Example 3 | 99.42 | 99.63 |
| Example 4 | 99.99 | 99.35 |
| Example 5 | 96.63 | 97.30 |

It can be seen from Tables 4, 5 and 6 that without the addition of softeners, antistatic agents or bactericides, these examples have good softening, antistatic and antibacterial effects on fabrics.

Detergency test: The test was conducted in accordance with GB/T 13174-2021 "Determination of detergency and cycle of washing property for laundry detergents", in which the washing water was $CaCl_2$ hard water at a hardness of 250 mg/kg, and the test fabrics were national standard carbon black JB-01 soiled fabric, national standard protein JB-02 soiled fabric, and national standard sebum JB-03 soiled fabric, for the determination of detergency. The results are shown in Table 7.

TABLE 7

Detergency test results

| Sample Name | JB-01 | JB-02 | JB-03 |
|---|---|---|---|
| 0.2% national standard laundry detergent | 14.5 | 3.5 | 5.73 |
| 0.2% national standard laundry detergent + 5 g of the color-protecting and fragrance-retaining composition of Example 2 | 14.63 | 3.5 | 5.70 |
| 0.2% national standard laundry detergent + 0.45 g of an aliphatic polyamine derivative (added in an equal proportion to the color-protecting agent in Example 2) | 13.27 | 3.0 | 4.6 |
| 0.2% national standard laundry detergent + 5 g of the color-protecting and fragrance-retaining composition of Example 3 | 14.53 | 3.47 | 5.74 |
| 0.2% national standard laundry detergent + 0.25 g of an aliphatic polyamine derivative + 0.05 g of modified vinylimidazole/vinylpyrrolidone + 0.05 g of a copolymer of vinylimidazole/vinylpyrrolidone (added in an equal proportion to the color-protecting agent in Example 3) | 13.77 | 3.33 | 4.43 |

As shown in Table 7, when the color-protecting and fragrance-retaining composition was used together with the national standard laundry detergent, the detergency was not affected. However, when the color-protecting agent was directly mixed with the national standard laundry detergent, there was a decrease in detergency.

These specific embodiments are merely an explanation of the present application, rather than a limitation of the present application. After reading this specification, a person skilled in the art can make modifications to these examples without any creative contribution as desired, but these modifications are protected by the patent law as long as they are within the scope of the claims of the present application.

What is claimed is:

1. A fabric care agent for color enhancement and brightening, comprising a color-enhancing and fragrance-retaining composition and a color-protecting and fragrance-retaining composition; wherein the color-enhancing and fragrance-retaining composition consists of the following raw materials by weight percentage:

a first shaping agent: 42-70%; a color enhancer: 10-30%; a dispersant: 0.5-10%; cellulase: 1.5-5%; a first fragrance: 2-10%; and a first auxiliary agent: 0.5-3%;

the dispersant comprises an esterquat and a non-ionic surfactant, and a mass ratio of the esterquat to the non-ionic surfactant is (0.5-5):(1-4);

the non-ionic surfactant comprises one or more of fatty alcohol-polyoxyethylene ethers, alkoxylated compounds, or ethylene oxide (EO)/propylene oxide (PO) block polyethers;

the color-protecting and fragrance-retaining composition consists of the following raw materials by weight percentage:

a second shaping agent: 48-90%; a filler: 5-30%; a color-protecting agent: 0.5-10%; a second fragrance: 1-10%; and a second auxiliary agent 0.5-3%.

2. The fabric care agent for color enhancement and brightening according to claim 1, wherein a mass ratio of the color-enhancing and fragrance-retaining composition to the color-protecting and fragrance-retaining composition is (0.5-6):1.

3. The fabric care agent for color enhancement and brightening according to claim 1, wherein the alkoxylated compounds comprise one or more of alkyl glycoside alkoxylates, fatty acid alkoxylates, or cardanol alkoxylates.

4. The fabric care agent for color enhancement and brightening according to claim 1, wherein the first shaping agent and the second shaping agent each independently comprise polyethylene glycol with a molecular weight of 4,000-20,000.

5. The fabric care agent for color enhancement and brightening according to claim 4, wherein the first shaping agent comprises polyethylene glycol with a molecular weight of 4,000-15,000 and polyethylene glycol with a molecular weight of 18,000-22,000 at a mass ratio of (4-5):(1-2).

6. The fabric care agent for color enhancement and brightening according to claim 1, wherein the first auxiliary agent and the second auxiliary agent each independently comprise one or more of sodium chloride, sodium sulfate, or glycerol.

7. The fabric care agent for color enhancement and brightening according to claim 1, wherein the color-protecting agent comprises one or more of copolymers of vinylimidazole/vinylpyrrolidone, modified copolymers of vinylimidazole/vinylpyrrolidone, or aliphatic polyamine derivatives.

8. The fabric care agent for color enhancement and brightening according to claim 1, wherein the filler comprises plant starch.

9. A method for preparing the fabric care agent for color enhancement and brightening of claim 1, comprising the following steps:

heating the first shaping agent to melt the first shaping agent, and then adding, under stirring, the dispersant, the color enhancer, the first fragrance, the cellulase, and the first auxiliary agent, to obtain a preliminary solution of the color-enhancing and fragrance-retaining composition;

granulating the preliminary solution of the color-enhancing and fragrance-retaining composition, followed by cooling to obtain the color-enhancing and fragrance-retaining composition;

heating the second shaping agent to melt the second shaping agent, and then adding, under stirring, the filler, the color-protecting agent, the second fragrance, and the second auxiliary agent, to obtain a color-protecting and fragrance-retaining preliminary solution;

granulating the color-protecting and fragrance-retaining preliminary solution, followed by cooling to obtain the color-protecting and fragrance-retaining composition, then mixing the color-enhancing and fragrance-retaining composition with the color-protecting and fragrance-retaining composition to obtain the fabric care agent; alternatively, granulating the color-protecting and fragrance-retaining preliminary solution on a surface of the color-enhancing and fragrance-retaining composition, followed by cooling to obtain the fabric care agent.

10. The method for preparing the fabric care agent for color enhancement and brightening according to claim 9, wherein loading the color-enhancing and fragrance-retaining composition and the color-protecting and fragrance-retaining composition in the fabric care agent respectively using a wrapping agent; alternatively, loading the fabric care agent obtained by combining the color-enhancing and fragrance-retaining composition and the color-protecting and fragrance-retaining composition using a wrapping agent.

* * * * *